United States Patent Office 2,841,602
Patented July 1, 1958

2,841,602

ALKYNOXY ACIDS

Henry Brown, Huntington Woods, Donald H. Becking, Detroit, and Thaddeus W. Tomaszewski, Dearborn, Mich., assignors to The Udylite Research Corporation, Detroit, Mich., a corporation of Michigan No Drawing. Application October 4, 1955
Serial No. 538,529

7 Claims. (Cl. 260—431)

This invention relates to a new class of unsaturated aliphatic acids consisting of alkynoxy sulfonic and alkynoxy carboxylic acids and salts thereof, illustrated in Table I.

Little is known about these unsaturated aliphatic acids containing the triple bonded carbon to carbon linkage (—C≡C—). In particular there is no description in the chemical literature, as far as we are aware, of these alkynoxy sulfonic acids, and alkynoxy carboxylic acids.

An object of this invention is to provide a new class of alkynoxy acids and their salts consisting of alkynoxy sulfonic acids of 3 to 14 carbon atoms inclusive and alkynoxy carboxylic acids of 5 to 15 carbon atoms, and their salts, which have technological value, for example, in plastics as monomers, in the formation of water-soluble high molecular weight resins, as acid pickling inhibitors, as dying assistants, as scavengers for hydrogen chloride and hydrogen bromide, in chlorinated or brominated solvents. A more particular object is to provide a new class of anionic addition agents (especially the alkynoxy sulfonic acids and their salts) that are useful in electroplating, especially in bright nickel plating.

The above objects are accomplished according to the present invention by providing a new class of unsaturated acids and their salts, consisting of alkynoxy alkane sulfonic acids of 3 to 14 carbon atoms inclusive, and alkynoxy alkane carboxylic acids of 5 to 15 carbon atoms and the salts thereof, all of which are exemplified in Table I. The alkane group in these acids contains from 1 to 4 carbon atoms.

The starting materials for the preparation of the alkynoxy acids (and their salts) of this invention are, for:

METHOD 1

An alkyne alcohol or glycol, a halo-alkane sulfonic acid or carboxylic acid (or sodium or potassium salt) in which the alkane group is not greater than butane, and sodium, potassium, or lithium hydroxide in water solution. These materials are refluxed for about 2 to 20 hours (preferably 3 to 10 hours), and the solution treated with activated carbon and filtered. If the dried salt is desired, the solution is acidified and evaporated to dryness and extracted with alcohol and the alcohol is then evaporated off. The white or slightly tan salt of the alkynoxy acid is then obtained.

Example 1 of Method 1

The preparation of 2-propynoxy-1-ethane sulfonic acid (Na salt) i. e. HC≡C—CH$_2$OC$_2$H$_4$SO$_3$Na.

Propargyl alcohol (1 mole), sodium 2-bromoethane sulfonate BrC$_2$H$_4$SO$_3$Na (1 mole), sodium hydroxide (1 mole) in water to make about a 20% solution, were refluxed for 6 hours. The solution was then treated with activated carbon and filtered to give a pale brown solution containing the 2-propynoxy-1-ethane sodium sulfonate. When this solution was filtered through a cationic exchange resin previously treated with a soluble nickel salt such as nickel chloride, most (75%) of the sodium ion was replaced by nickel ion with one pass through the cationic exchange bed (a polystyrene nuclear sulfonic resin bed).

Analysis.—Calculated for C$_5$H$_7$SO$_4$Na: C, 32.25; H, 3.76; S, 17.20. Found: C, 32.4; H, 3.5; S, 17.0.

Example 2 of Method 1

The preparation of 2-propynoxy-1-acetic acid (Na salt), HC≡C—CH$_2$OCH$_2$COONa.

Propargyl alcohol (1 mole), mono-chloroacetic acid (1 mole), and sodium hydroxide to give a 10 to 20% aqueous caustic solution, is refluxed for about 3 hours. The solution is filtered with activated carbon and contains 2-propynoxy-1-acetic acid (Na salt) dissolved therein.

Example 3 of Method 1

The preparation of 2-butynoxy-1,4-diacetic acid (Na salt), NaOOC—CH$_2$OCH$_2$—C≡C—CH$_2$OCH$_2$COONa.

2-butyne 1,4-diol (1 mole), monochloroacetic acid (2 moles), sodium hydroxide (2 moles) dissolved in water to give a 10 to 20% caustic solution are refluxed for about 3 hours. The solution is treated with activated carbon and filtered giving an aqueous solution of 2-butynoxy-1,4-diacetic acid (Na salt).

METHOD 2

An admixture is made of an alkyne halide, a hydroxy alkane sulfonic acid (Na or K salt) in which the alkane group is not greater than butane, and sodium, lithium or potassium hydroxide in water solution. These materials are refluxed for about 2 to 20 hours (preferably 3 to 10 hours) and then the solution is treated with activated carbon and filtered to give a water solution of the alkynoxy alkane sodium sulfonate.

Example 1 of Method 2

The preparation of 2-propynoxy-1-ethane sulfonic acid (Na salt). Isethionic acid (Na salt), HO—C$_2$H$_4$SO$_3$Na (1 mole), propargyl bromide (1 mole), and 1 mole sodium hydroxide in about 20% strength are refluxed for about 8 hours. The solution is treated with activated carbon and filtered to give a water solution of 2-propynoxy-1-ethane sulfonic acid (Na salt).

Example 2 of Method 2

The preparation of 2-butynoxy-1,4-di-ethane sulfonic acid (Na salt),

NaO$_3$S—C$_2$H$_4$OCH$_2$—C≡C—CH$_2$OC$_2$H$_4$SO$_3$Na

Isethionic acid (Na salt) (2 moles), 1,4-dichloro butyne-2 (1 mole) and 1 mole of sodium hydroxide in about a 20% water solution are refluxed for about 8 hours. The solution is treated with activated carbon and filtered to give a water solution of 2-butynoxy-1,4-di-ethane sodium sulfonate.

METHOD 3

An alkyne alcohol or glycol, a di-halo alkane in which the alkane group is not greater than butane, and sodium, potassium or lithium hydroxide in water solution are refluxed for about 3 to 20 hours, sodium sulfite is then added, and the solution refluxed for an additional 4 to 20 hours. The solution is then treated with activated carbon and hydrogen peroxide (to oxidize any excess of sodium sulfite). The solution is then filtered to give a pale brown solution which contains the alkynoxy alkane sodium sulfonate. The dried white sodium salt can be obtained as outlined in Method 1.

Example 1 of Method 3

The preparation of 1-methyl, 1-ethyl-2-propynoxy-1-ethane sulfonic acid (Na salt). Methyl pentynol (1 mole), ethylene dibromide (1 mole), sodium hydroxide (1 mole) in 20% aqueous solution were refluxed for 4 hours, then 1 mole of sodium sulfite was added and the solution refluxed for an additional 6 hours. The solution was then treated with activated carbon and hydrogen peroxide (or sodium peroxide) to oxidize any excess of sulfite remaining. The solution was then filtered to give a pale brown solution containing 1-methyl, 1-ethyl-2-propynoxy-1-ethane sulfonic acid (Na salt),

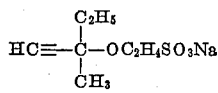

METHOD 4

An alkyne alcohol or glycol, a di-halo alkane in which the alkane group is not greater than butane, and sodium, potassium or lithium hydroxide solution are refluxed for about 3 to 8 hours, and the insoluble oil separated off. The oil is then refluxed with concentrated sodium sulfite solution for about 4 to 20 hours. This gives, after treatment with activated carbon and hydrogen peroxide, a pale yellow or pale brown solution containing the alkynoxy alkane sodium sulfonate.

Example 1 of Method 4

The preparation of 2-butynoxy-1,4-diethane sulfonic acid (Na salt). Butyne-1,4-diol (1 mole), ethylene dibromide (2 moles) and sodium hydroxide (1 mole) in about 20% solution are refluxed for about 6 hours and the solution cooled and the heavy oily brown liquid which separates to the bottom is drawn off. The yield is about 60% on the first run, but with re-use of the water solution for the second batch the yield is increased to about 80%. The oily liquid is then reacted with 1.75 moles of sodium sulfite in a saturated water solution, by refluxing for about 4 to 6 hours, and the solution is then treated with activated carbon and hydrogen peroxide and filtered to give a pale yellow solution of the 2-butynoxy-1,4, diethane sodium sulfonate $(NaO_3S-C_2H_4OCH_2-C\equiv C-CH_2OC_2H_4SO_3Na)$ with allyl sulfonic acid and o-benzoyl sulfimide and benzene sulfonic acid. For example:

| | |
|---|---|
| NiSO$_4$.6H$_2$O | 150–300 grams/liter. |
| NiCl$_2$.6H$_2$O | 30–60 grams/liter. |
| H$_3$BO$_3$ | 30–45 grams/liter. |
| NaBF$_4$ | 0–3 grams/liter. |
| 2-propynoxy-1-ethane sulfonic acid (Na or Ni salt) | 0.04–0.12 grams/liter. |
| Allyl sulfonic acid (Na or Ni salt) | 0.5–1.5 grams/liter. |
| o-Benzoyl sulfimide | 0.1–2 grams/liter. |
| Benzene sulfonic acid (Na or Ni salt) | 0–8 grams/liter. |
| pH | 2.5 to 4.0. |
| Temperature | 45° C. to 80° C. |
| Cathode current densities | 1 to 10 amps./sq. dm. (approximately 10 to 100 amps./sq. ft.). |

The higher the solution agitation the higher the current density that can be used.

The butynoxy ethane sulfonic acids (or their nickel or sodium salts, etc.) are also good additives for obtaining bright ductile nickel plate when used in place of the propynoxy ethane sulfonic acids in the above formulation.

The amine salts of the alkynoxy acetic acids such as propynoxy acetic acid and butynoxy acetic acids used in a concentration of about 1 to 2 grams/liter are good scavengers for hydrogen chloride and good stabilizers for trichloroethylene.

The alkynoxy sulfonic acids and carboxylic acids are of value as acid pickling inhibitors when used in a concentration of about 1 to 3 grams/liter.

What is claimed is:

1. An unsaturated aliphatic acid selected from the group consisting of alknoxy sulfonic acids having 3 to 14 carbon atoms inclusive, alknoxy carboxylic acids having 5 to 15 carbon atoms and the sodium, potassium, nickel, cobalt, iron, magnesium, ammonium, mercury

TABLE I.—ALKYNOXY SULFONIC AND ALKYNOXY CARBOXYLIC COMPOUNDS

| | |
|---|---|
| 1. HC≡C–CH$_2$OC$_2$H$_4$SO$_3$H | (Na, K, Ni, Co, Fe, Mg, NH$_4$, Hg, amine salts etc.) |
| 2. HC≡C–CH$_2$OC$_3$H$_6$SO$_3$H | (Na, K, Ni, Co, Fe, Mg, NH$_4$, Hg, amine salts etc.) |
| 3. HC≡C–C(CH$_3$)$_2$–OC$_2$H$_4$SO$_3$H | (Na, K, Ni, Co, Fe, Mg, NH$_4$, Hg, amine salts etc.) |
| 4. HC≡C–C(CH$_3$)(C$_2$H$_5$)OC$_2$H$_4$SO$_3$H | (Na, K, Ni, Co, Fe, Mg, NH$_4$, Hg, amine salts etc.) |
| 5. HC≡C–CH(CH$_3$)OC$_2$H$_4$SO$_3$H | (Na, K, Ni, Co, Fe, Mg, NH$_4$, Hg, amine salts etc.) |
| 6. HC≡C–CH$_2$OCH$_2$COOH | (Na, K, Ni, Co, Fe, Mg, NH$_4$, Hg, amine salts etc.) |
| 7. HO$_3$S–C$_2$H$_4$OCH$_2$–C≡C–CH$_2$OC$_2$H$_4$SO$_3$H | (Na, K, Ni, Co, Fe, Mg, NH$_4$, Hg, amine salts etc.) |
| 8. HO–CH$_2$–C≡C–CH$_2$OC$_2$H$_4$SO$_3$H | (Na, K, Ni, Co, Fe, Mg, NH$_4$, Hg, amine salts etc.) |
| 9. HO–CH$_2$–C≡C–CH$_2$OCH$_2$COOH | (Na, K, Ni, Co, Fe, Mg, NH$_4$, Hg, amine salts etc.) |
| 10. HOOC–CH$_2$–OCH$_2$–C≡C–CH$_2$OCH$_2$COOH | (Na, K, Ni, Co, Fe, Mg, NH$_4$, Hg, amine salts etc.) |
| 11. HO$_3$S–C$_2$H$_4$OCH$_2$–C≡C–CH$_2$OC$_2$H$_4$OCH$_2$–C≡C–CH$_2$OC$_2$H$_4$SO$_3$H | (Na, K, Ni, Co, Fe, Mg, NH$_4$, Hg, amine salts etc.) |
| 12. HO–CH$_2$–C≡C–CH$_2$O–C(CH$_2$COOH)–COOH<br>HO–CH$_2$–C≡C–CH$_2$O–CH–COOH | (Na, K, Ni, Co, Fe, Mg, NH$_4$, Hg, amine salts etc.) |

The sodium, potassium or lithium salts or the nickel salts of the propynoxy ethane sulfonic acids are very good additives for obtaining bright ductile plate from acidic nickel baths of the Watts type when used in conjunction with and amine salts thereof, said acids containing an alkane group having from 1–4 carbon atoms.

2. An unsaturated aliphatic acid selected from the class consisting of alkynoxy alkane sulfonic acids having 3 to 14 carbon atoms inclusive, alkynoxy alkane carboxylic acids and their salts having 5 to 15 carbon atoms and the sodium, potassium, nickel, cobalt, iron, magnesium, ammonium, mercury and amine salts thereof, the alkane group of said acids containing 1 to 4 carbon atoms.

3. 2-propynoxy-1-ethane sulfonic acid $$(HC\equiv C-CH_2OC_2H_4SO_3H)$$

the sodium, potassium, nickel, cobalt, iron, magnesium, ammonium, mercury and amine salts thereof.

4. 1,1-dimethyl-2-propynoxy-1-ethane sulfonic acid $$(HC\equiv C-C(CH_3)_2OC_2H_4SO_3H)$$

the sodium, potassium, nickel, cobalt, iron, magnesium, ammonium, mercury and amine salts thereof.

5. 2-butynoxy-1,4-di-ethane sulfonic acid $$(HO_3S-C_2H_4OCH_2-C\equiv C-CH_2OC_2H_4SO_3H)$$

the sodium, potassium, nickel, cobalt, iron, magnesium, ammonium, mercury and amine salts thereof.

6. 2-propynoxy-1-acetic acid $$(HC\equiv C-CH_2OCH_2COOH)$$

the sodium, potassium, nickel, cobalt, iron, magnesium, ammonium, mercury and amine salts thereof.

7. 2-butynoxy-1,4-di-acetic acid $$(HOOC-CH_2OCH_2-C\equiv C-CH_2OCH_2COOH)$$

the sodium, potassium, nickel, cobalt, iron, magnesium, ammonium, mercury and amine salts thereof.

References Cited in the file of this patent
UNITED STATES PATENTS

| | | |
|---|---|---|
| 2,170,380 | Holsten | Aug. 22, 1939 |
| 2,352,461 | Walker | June 27, 1944 |